Oct. 17, 1939.     H. J. SAUER     2,176,723
REAR VISION MIRROR BRACKET
Filed April 13, 1938
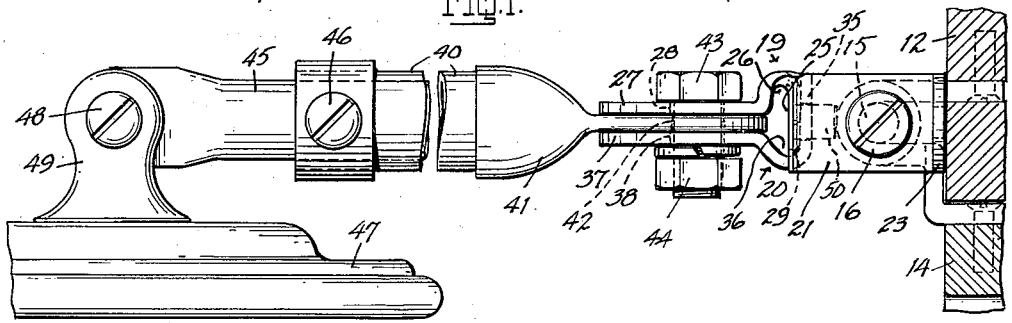
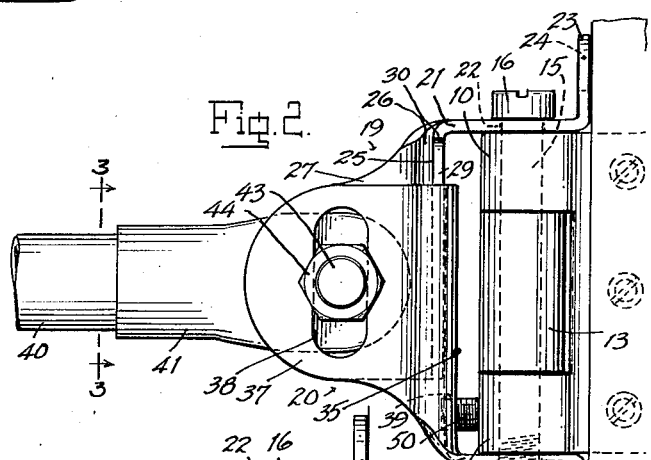
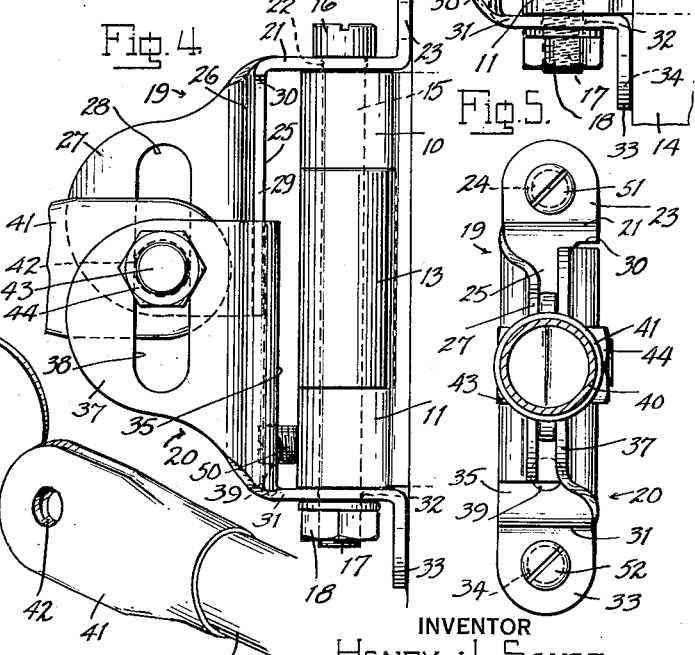
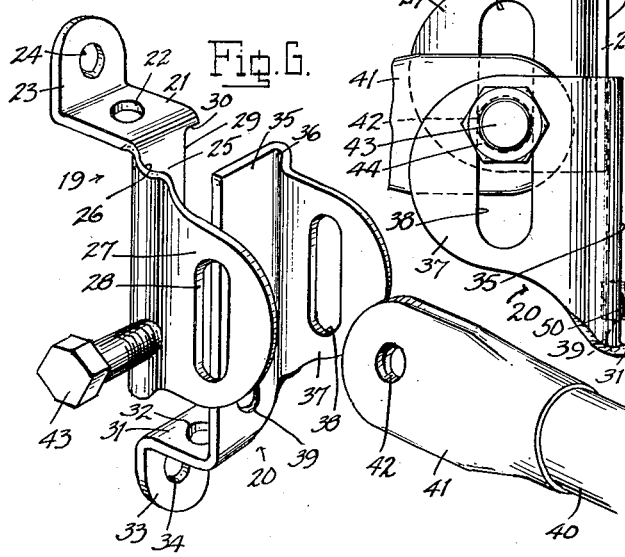
INVENTOR
HENRY J. SAUER.
BY
ATTORNEY Patented Oct. 17, 1939

2,176,723

UNITED STATES PATENT OFFICE 2,176,723

REAR VISION MIRROR BRACKET

Henry J. Sauer, Fairfield, Conn.

Application April 13, 1938, Serial No. 201,713

2 Claims. (Cl. 248—205)

The present invention relates to a rear vision mirror bracket particularly adapted for use in connection with an automobile door hinge and for attachment to the hinge through the medium of the hinge pin. Various makes of automobiles and auto trucks have different sized hinges, so that difficulty has been experienced in providing a standard bracket that would fit any size hinge, and as consequently it has been necessary to provide different sized brackets for different sized hinges. It is an object of the present invention to provide an adjustable bracket which may be secured to any of the various sized hinges within given minimum and maximum limits, and which will provide a secure support for the mirror and will not interfere with the operation of the door. A further object is to provide a bracket which may be attached either to the hinge, by means of a hinge pin, or to the automobile body at some other point by means of screws. To this end it is proposed to provide ears upon the upper and lower parts of the bracket, which ears may serve either to hold the parts in place against the body structure against turning when the bracket is attached to the hinge, or may be engaged by attaching screws to secure the bracket to the body structure at some other point than the hinge. Another object is to provide a bracket to which the mirror supporting arm is adjustably connected so that its position may be varied angularly adjusted within a radius of approximately 180°.

With the above and other objects in view, an embodiment of the invention is shown in the accompanying drawing, and this embodiment will be hereinafter more fully described with reference thereto, and the invention will be finally pointed out in the claims.

In the drawing:

Fig. 1 is a top plan view of the rear vision mirror and bracket, according to the mirror supporting arm.

Fig. 2 is a side elevation of the bracket, and showing a portion of the mirror supporting arm.

Fig. 3 is a front elevation of the bracket, the arm being in vertical section along the line 3—3 of Fig. 2.

Fig. 4 is a side elevation similar to Fig. 2 but showing the bracket attached to a hinge having a greater vertical dimension than the hinge shown in Fig. 2.

Fig. 5 is a front elevation showing the bracket secured by screws to the body structure.

Fig. 6 is a perspective view showing the various parts of the bracket and the end of the mirror supporting arm in separated relation.

Similar reference characters indicate corresponding parts throughout the several figures of the drawing.

Referring to the drawing the automobile hinge comprises two stationary end hinge knuckles 10 and 11 secured to the door frame 12, an intermediate rotatable hinge knuckle 13 secured to the door frame, and a hinge pin 14 having a head 15 at its upper end, and which is engaged through the holes in the knuckles 10, 11 and 13, being provided at its lower end with threads 17 adapted to be engaged by a securing nut 18. The hinge pin just described forms part of the bracket as supplied for attachment to the hinge. It will be understood that the hinge pin originally forming part of the hinge, and which does not as a rule have a nut upon its lower end, is driven out of the hinge by inserting a suitable driving tool in the lower end and hammering upwardly, and is thereupon replaced by the hinge 13 forming part of the bracket.

The bracket comprises upper and lower telescopically connected members which are indicated generally as 19 and 20. The upper member comprises a top horizontal portion 21 having a hinge pin hole 22 therein, and having an ear 23 bent upwardly from its rearward edge, this ear being provided with an aperture 24 for receiving an attachment screw, as will hereinafter more fully appear. At the forward end of the top portion 21 a forward portion 25 is bent downwardly, one vertical edge of this portion 25 being bent forwardly and inwardly to provide a vertical channel 26 and then being bent forwardly to form an ear 27 in which there is provided a vertical slot 28. The other vertical edge 29 of the portion 25 is inwardly offset to provide a shoulder 30 adjacent the top 21, this inwardly offset edge adapted to engage within a vertical channel of the lower member 20, as will presently more fully appear.

The lower member 20 comprises a bottom horizontal portion 31 having a hinge pin receiving hole 32 therein and having at its inner edge a downwardly bent ear 33 having a screw receiving hole 34. At the forward end of the portion 31 a vertical portion 35 is bent upwardly, one vertical edge of this portion 35 being bent forwardly and inwardly to provide a vertical channel 36 from which an ear 37 is bent forwardly, this ear being provided with a vertical slot 38. At the lower end of the portion 35 there is provided a threaded hole 39 to receive a set screw for tightly securing the bracket against rotation, as will hereinafter more fully appear.

The members 19 and 20 are so designed that when they are telescopically connected with each other the hinge pin receiving holes 22 and 32 are vertically aligned, the forward portion 35 of the member 20 engages the rearward surface of the forward portion 36 of the member 19, and the inwardly offset edge 29 of the member 19 is slidably and interlockingly engaged in the vertical channel 36 of the member 20. In this engaged relation the slots 28 and 38 are aligned for the purpose of receiving the bolt for securing the mirror supporting arm, as will presently more fully appear. The upper and lower ends of the slots 38 are aligned in the intermediate portion of adjustment of the members 19 and 20, shown in Figs. 2 and 3. In the fully contracted relation, with the upper end of the member 20 abutting the shoulder 30, the upper end of the slot 28 of the member 19 and the lower end of the slot 38 of the member 20 are brought relatively close to the attaching bolt of the mirror supporting arm, while in the fully extended position, shown in Fig. 4, the lower end of the slot 28 of the member 19 and the upper end of the slot 38 of the member 20 abut the attaching bolt.

The mirror supporting arm 40 is provided at its end with a flattened bearing cap 41 having a bolt receiving hole 42, this flattened bearing cap being engaged between the ears 27 and 37 of the bracket members 19 and 20, and being clampingly secured between them by means of a bolt 43 and nut 44, the connection permitting of angular adjustment of the arm through approximately 180°, this adjustment being fixed by tightening the bolt and nut to thus securely clamp the arm between the ears 27 and 37. Within the arm 40 there is telescopically engaged an extension arm 45 which is secured in the desired position of longitudinal and rotary adjustment by a set screw 46. Upon the end of the arm 45 the mirror 47 is adjustably secured by a bolt 48 engaged through the apertured clamping bracket 49 provided upon the back of the mirror. Through the rotary adjustment of the mirror about the axis of the bolt 48, the extensible and rotary adjustment of the arm 39 within the arm 40, and the angular adjustment of the arm 40 about the bolt 43, the position of the mirror is capable of being universally adjusted as to angle and position. This tightening of the bolt and nut also fixes the relative vertically adjusted position of the bracket members 19 and 20 and by loosening the bolt and nut this relative position may be adjusted for the purpose of fitting the bracket to the hinge, it being understood that in the case of a relatively short hinge the members 19 and 20 will be contracted and in the case of a long hinge they will be extended. It will be understood that the bracket as supplied will be provided with the hinge pin 13 having the nut 18 upon its lower end.

In order to attach the bracket to the hinge the hinge pin originally supplied with the hinge driven out, and thereupon the bracket is engaged about the hinge so that the holes 22 and 32 of the members 19 and 20 are aligned with the holes through the hinge knuckles, and the upper and lower members 19 and 20 being telescopically adjusted to bring the horizontal upper and lower portions 21 and 31 into engagement with the upper and lower ends of the fixed hinge knuckles 10 and 11. The hinge pin 13 is thereupon engaged through the aligned holes in the bracket and hinge and is secured by engaging and tightening the nut 18. A set screw 50 is engaged in the hole 39 and tightened against the lower knuckle 11 of the hinge, and as this lower knuckle is the fixed part of the hinge secured to the door frame the bracket will thus be rigidly secured to the frame. In the case where the door structure has its surface so arranged that the ears 23 and 33 of the upper and lower members engage against the surface of the frame, the set screw may be dispensed with as the abutment of the ears with the frame will prevent any tendency of the bracket to rotate. In the case where it is desired to attach the bracket at some other point of the body structure than the hinge, this may be done by means of screws 51 and 52 engaged through the holes 24 and 34 of the ears 23 and 33, as shown in Fig. 5, the members 19 and 20 being in their fully contracted relation.

I have illustrated and described a preferred and satisfactory embodiment of the invention, but it will be obvious that changes may be made therein, within the spirit and scope thereof as defined in the appended claims.

Having thus described my invention what I claim and desire to secure by Letters Patent is:

1. A bracket of the character described for attachment to a hinge including tubular knuckles and a removable pin, comprising a pair of bracket members slidably engaged for vertical adjustment movement relative to each other, each of said members having a horizontally extending apertured portion, said apertured portions adapted to be respectively engaged with the upper and lower ends of the hinge, one of said members having a vertically disposed portion bent at a right angle to its horizontal apertured portion and an apertured ear bent outwardly from one vertical edge of said vertically disposed portion, said ear having a vertical channel adjacent said vertically disposed portion and the other of said members having a vertically disposed portion bent at a right angle to its horizontal apertured portion having a vertical edge portion engaged in said channel and an apertured ear bent outwardly from its other vertical edge, a bolt engaged through said apertured ears and securing said members in vertically adjusted relation, and a hinge pin adapted to be engaged through said apertured portions and through said hinge knuckles.

2. A bracket of the character described for attachment to a hinge including tubular knuckles and a removable pin, comprising a pair of bracket members slidably engaged for vertical adjustment movement relative to each other, each of said members having a horizontally extending apertured portion, said apertured portions adapted to be respectively engaged with the upper and lower ends of the hinge, each of said members having a forwardly projecting vertically disposed ear having a vertical slot, said ears being disposed in opposed parallel relation with said slots in vertical alignment and adapted to receive between them the apertured end of a supporting arm for a mirror or the like, a bolt extended through said slots and adapted to engage the aperture of said arm to clamp said arm between said ears and to secure said members in vertically adjusted relation, the diameter of said bolt being less than the respective lengths of said slots whereby said bolt and supporting arm may be adjusted vertically in said slots and a hinge pin adapted to be engaged through said apertured portions and through said hinge knuckles.

HENRY J. SAUER.